March 24, 1953  B. JONES  2,632,474
DAMPENER FOR DIFFERENTIAL PRESSURE INDICATORS
Filed April 22, 1950
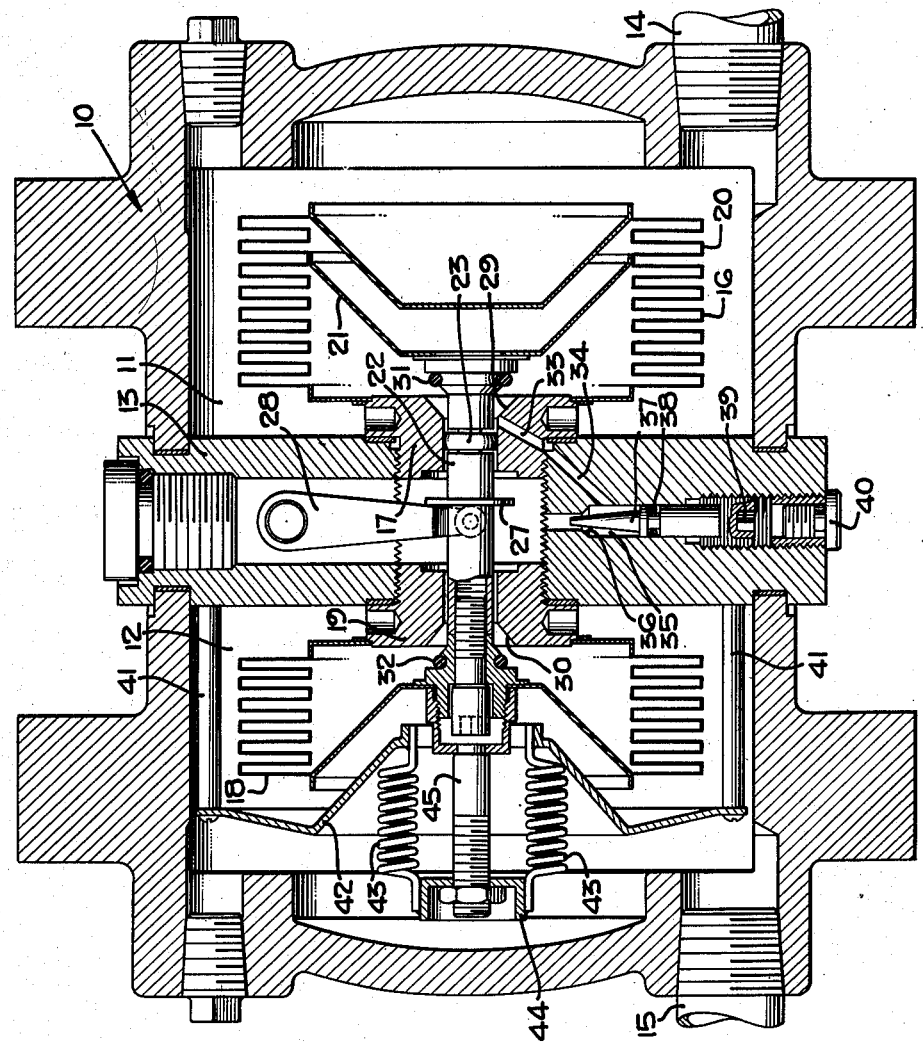
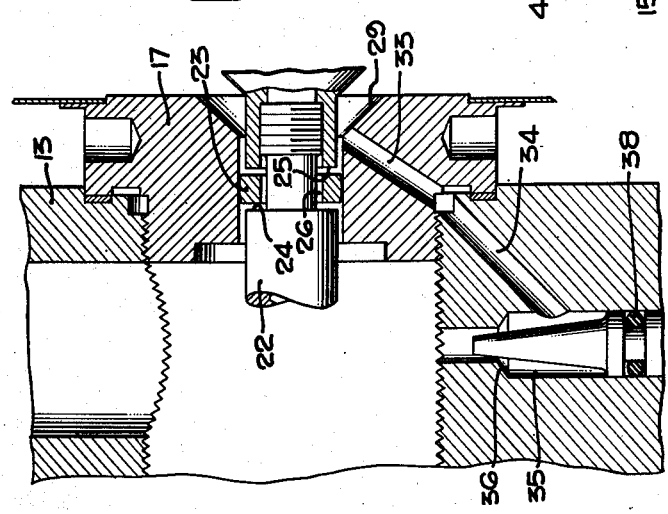
BARTON JONES,
INVENTOR.
BY Hazard & Miller
ATTORNEYS Patented Mar. 24, 1953

2,632,474

UNITED STATES PATENT OFFICE 2,632,474

DAMPENER FOR DIFFERENTIAL PRESSURE INDICATORS

Barton Jones, Los Angeles, Calif.

Application April 22, 1950, Serial No. 157,577

7 Claims. (Cl. 137—781)

This invention relates to a dampener for differential pressure indicators and devices responsive to a differential existing between two pressures. It may be regarded as an improvement over the devices disclosed in my prior United States Patent No. 2,400,048, issued May 7, 1946, and the devices disclosed in my application for United States Letters Patent, Serial No. 528,409, filed March 28, 1944, now Patent No. 2,590,324.

In the patent and application above referred to, devices are disclosed consisting essentially of a housing divided into two chambers by an intervening partition. Within these chambers there are disposed opposed bellows of substantially equal effective area. Each bellows has its inner end secured to the partition while the outer or free ends of the bellows are rigidly connected together through the partition so that they will be caused to move in unison. The bellows are filled with liquid and are in communication with each other under normal conditions around the connecting means that rigidly connects their outer ends. The pressures between which a differential may exist are conducted to the chambers respectively and are effective on the exteriors of the bellows. On the sides of the partition there are valve seats and the valve closures adapted to seat thereon are provided on the connecting means so that although communication ordinarily exists from one bellows to the other, if the differential between the pressures applied to the chambers becomes excessive a valve closes thus entrapping liquid in the bellows subjected to the abnormally high pressure and preventing its being damaged or destroyed. The movement of the connecting means between the bellows is transmitted to the exterior of the housing and may operate a pointer over a dial, a pen arranged to traverse a chart, or any suitable control that is to be regulated by the differential in pressure.

In a device of this character it frequently occurs that one or both pressures conducted to the chambers fluctuate severely. Thus, the pressure supplied to one chamber may surge so that if the device is used to operate a pen arranged to traverse a rotating chart the pen is caused to fluctuate severely with the result that its supply of ink must be frequently replenished. Usually in such situations although the pressure may be surging severely the average differential in pressure is all that is desired on the chart, and it is consequently desirable to dampen the movements of the bellows and their connecting means so that the pen or other device actuated by the connecting means will not be instantly responsive to the surges.

It is therefore an object of the present invention to provide a means for dampening differential pressure indicators of this type which can be easily and quickly adjusted to secure the desired dampening effect. Thus, under certain circumstances the surging of the pressures applied to the device is sufficiently low so that only a very small amount of dampening is required whereas in other situations where the surging is severe greater dampening is necessary. The present invention enables adjustment to be secured to meet varying conditions.

Another object of the invention is to provide a dampener for the type of device above described consisting essentially of an adjustable bypass for fluid conducted from one bellows to another, the entrance to the bypass being so arranged that if the device is subjected to abnormally heavy pressure not only will the communication between the bellows be closed to prevent destruction of the bellows through the normal line of flow but the bypass will also be closed automatically.

With the foregoing and other objects in view, which will be made manifest in the following detailed description, and specifically pointed out in the appended claims, reference is had to the accompanying drawings for an illustrative embodiment of the invention, wherein:

Figure 1 is a longitudinal vertical section through a differential pressure responsive device illustrating the dampener embodying the present invention as having been incorporated therein; and Fig. 2 is a partial view in vertical section on an enlarged scale illustrating a detail of construction.

Referring to the accompanying drawings wherein similar reference characters designate similar parts throughout, the improved differential pressure responsive device consists essentially of a housing generally indicated at 10 and which may be made up of several parts adequately secured together and suitably gasketed. Within the housing there are two chambers 11 and 12 defined from each other by a partition 13. One of the pressures between which a differential may exist is conducted to the chamber 11 through a conduit 14 and similarly the other pressure is conducted to the chamber 12 through a conduit 15.

In the chamber 11 there is a bellows 16 having its inner end secured to the partition, such as through a nut 17 that is threaded into the partition. In a similar manner, the chamber 12 has a bellows 18, the inner end of which is secured to the partition such as by nut 19. These bellows 16 and 18 are of substantially equal effective areas although the bellows 16 may have secured thereto an auxiliary bellows 20, the interior of which is in communication with bellows 16 such as through a port 21. This auxiliary bellows which is the subject matter of my application Serial No. 528,409, filed March 28, 1944, constitutes a compensator to compensate for temperature changes in the liquid that completely fills all of the bellows 16, 18, and 20. Thus, if the liquid in the bellows 16 and 18 expands due to a rise in temperature some liquid may flow through port 21 into the bellows 20 causing the bellows 20 to expand. Expansion of bellows 20, however, does not influence or modify the position of the bellows 16 and 18 under the influence of the pressures supplied to their respective chambers 11 and 12. Conversely, a decrease in temperature in the liquid may permit some liquid on the interior of bellows 20 to flow through port 21 into the bellows 16 and 18.

The outer or free ends of the bellows 16 and 18 are rigidly connected to each other by a connecting rod or stem 22 that extends through the two nuts 17 and 19 and consequently, through the partition 13. This rod or stem is preferably made of several parts threadedly connected. It serves to cause the outer ends of bellows 16 and 18 to move in unison under the influence of the pressures applied to the chambers 11 and 12.

In the constructions disclosed in my prior patent and application, above referred to, liquid was permitted to flow from one bellows to the other through the intervening partition around the connecting rod or stem. In other words, a clearance space between the connecting rod or stem and the partition provided the communication between the two bellows under normal operating conditions. In the present construction an attempt is made to prevent such flow but still permit of some looseness or play between the stem 22 and the nuts 17 and 19 on the partition. To this end the interior of the nut 17 is carefully ground or lapped to provide a cylindrical surface against which the peripheral surface of a ring or disc 23 is slidable. This ring or disc has its external surface ground to conform to a portion of a sphere and closely fits the interior of the nut. Its sides are also preferably lapped so as to seat upon and form seals with adjacent shoulders 24 and 25 on the stem. Preferably, a substantial clearance indicated at 26 is left between the interior of the ring 23 and the reduced portion on the stem 22 between the two shoulders 24 and 25. The purpose of this clearance is to enable the stem 22 to have some looseness or play within the interior of the nut 17, which looseness or play is frequently necessary due to inaccuracies of manufacture and of assembly. It will be appreciated, however, that if pressure exists within the bellows 16 greater than pressure within the bellows 18, that the ring 23 will be crowded by such pressure against the shoulder 24, thus forming a good metal-to-metal seal preventing flow around the stem from bellows 16 to bellows 18. Conversely, if pressure within the bellows 18 is higher the ring 23 will be forced thereby against the lapped shoulder 25 forming a good metal-to-metal seal. While the seal produced in this manner may not be a perfect or absolute seal the intention is to make the seal as good as possible. At the same time, however, if, during movements of the bellows the stem 22 tends to rise or fall or move laterally such movement is permitted within limits afforded by the clearance 26.

On the stem 22 there is a flange 27 engageable by a roller on a pivoted arm 28. Movements of the stem 22 under the influence of pressures applied to the chambers 11 and 12 are thus transmitted to the arm and from the arm to the exterior of the housing 10. The arm may serve to turn a pointer traversing a dial or to swing a pen relatively to a rotating chart or it may operate some other type of control device.

The outer ends of the nuts 17 and 19 are coned out to provide conical valve seats 29 and 30, respectively, and valve closures are provided on the ends of the stem adapted to seat thereon. These valve closures are formed in part by O-rings 31 and 32 partially recessed on the ends of the stem 22 so that if pressure in the chamber 11 is abnormally high the seating of O-ring 31 on valve seat 29 will entrap the liquid in the bellows 16 preventing complete collapse of the bellows and consequently preventing its destruction.

Similarly, if the pressure in the chamber 12 becomes abnormally high O-ring 32 on seating on valve seat 30 will prevent escape of the liquid from the bellows 18 and the bellows will thus be protected against destruction.

A bypass is provided around the barrier afforded by the ring 23. This bypass consists of a passage 33 formed in the nut 17 and a passage 34 formed in the partition 13 that communicates with a radial passage 35 in the partition. The radial passage has a seat 36 toward and away from which a needle valve 37 is adjustable. An O-ring 38 prevents outward leakage around the needle valve. The needle valve has a recessed head 39 that is threaded into the threaded portion of the passage 35. The outer end of the passage is normally closed by a plug 40.

It will be noted that the entrance to the passage 33 from bellows 16 is disposed at the inner end of the valve seat 29 so that when the O-ring 31 is seated the bypass will be closed. If the bypass valve 37 is fully open the device is in its most sensitive condition in that if pressure is suddenly applied to chamber 11 greatly in excess of the pressure existing in chamber 12, it will tend to collapse bellows 16 and in so doing, as liquid in bellows 16 can readily flow through the bypass into bellows 18, the stem 22 will move from right to left as viewed in Fig. 1 in an amount directly commensurate with the pressure. On the other hand, if the bypass is closed or restricted by the needle valve 37 and pressure in the chamber 11 is suddenly increased, this will urge the fluid out of bellows 16 and through the bypass but its escape from the bellows 16 will be retarded. This retarding of the escape of liquid from bellows 16 will retard collapse of the bellows and consequently will retard movement of the stem 22, thus dampening the operation of the device in response to sudden increases of pressure. The rate of which fluid can flow through the bypass is thus regulatable by the needle valve 37 that can be adjusted from the exterior of the housing. If fluid cannot readily flow through the bypass there will be a retarding of the movement of the stem 22 in response to surges of increased pressure. Adjustment of the needle valve will thus affect the sensitivity of the device. It will, of course, be appreciated that if the pressure applied to chamber 11 increases and stays increased, or if the pressure applied to chamber 11 gradually increases that liquid in the bellows 16 will flow through the bypass even though its flow is retarded. Consequently, under thes circumstances stem 22 will slowly move from right to left so that the device will subsequently assume its proper position commensurate with the increased pressure applied. However, the present device has its greatest utility where chamber 11 is subjected to surges of increased pressure wherein these increases in pressure are but momentary and the pressure then returns to normal. During these momentary surges if the bypass is throttled the movement or shifting of the stem 22 is delayed or retarded so that an effective dampening action can be secured. If the bypass is completely closed the device is still operable due to the very slow leakage that may take place around or through ring 23. This leakage is very slow and when the bypass is completely closed the device is in its least sensitive condition.

In the chamber 12 posts 41 are illustrated as having been mounted to support a spring tensioner 42. Tension springs 43 are connected thereto and to a cap 44. A bolt or the equivalent indicated at 45 connects the cap 44 to the stem 22, the arrangement being such that the tension springs constantly urge the stem 22 in that position wherein the arm 28 will cause it to hold the pointer operated thereby on the pen operated thereby at zero position.

From the above described construction it will be appreciated that the improved differential pressure indicator provides a novel but highly effective seal between the interiors of the two bellows around the stem 22, this seal being such that the stem 22 is afforded considerable play at all times, but leakage thereabout is greatly retarded if not entirely prevented. The improved construction is also highly advantageous in that an adjustable bypass is provided around the seal that can be adjusted to give any desired dampening effect so that the device will not be instantly responsive to all temporary surges of pressure. While the bypass is normally open providing for communication between the bellows if pressure in one chamber becomes abnormally excessive, causing the stem 22 to move sufficiently to seat one of the rings 31 or 32, flow through the bypass is automatically stopped and the liquid is entrapped in the two bellows preventing collapse and destruction of the bellows.

Various changes may be made in the details of construction without departing from the spirit and scope of the invention as defined by the appended claims, wherein I claim:

1. In a device responsive to differential pressures wherein there are two chambers, means for conducting pressures to said chambers respectively, bellows in each chamber, said bellows being of equal effective areas and having their adjacent ends secured to adjacent walls of the respective chambers and their remote ends rigidly secured together for movement in unison, a liquid filling the bellows, there being a restricted passage providing communication from one bellows to the other, communication between the bellows being otherwise precluded, and means for regulating the flow through said restricted passage.

2. In a device responsive to differential pressures wherein there are two chambers, means for conducting pressures to said chambers respectively, bellows in each chamber, said bellows being of equal effective areas and having their adjacent ends secured to adjacent walls of the respective chambers and their remote ends rigidly secured together for movement in unison, a liquid filling the bellows, there being a restricted passage providing communication from one bellows to the other, communication between the bellows being otherwise precluded, and means for regulating the flow through said restricted passage operable from the exterior of said chambers.

3. A device responsive to differential pressures comprising means providing two chambers defined from each other by a partition, means for conducting pressures to said chambers respectively, a bellows in each chamber, said bellows being of equal effective areas and having their adjacent ends secured to opposite sides of the partition, means rigidly connecting the remote ends of the bellows through the partition to cause them to move in unison under the influence of pressure applied to their respective chambers, a liquid filling the bellows, means forming a seal between the connecting means and the partition, and means providing a restricted passage connecting the bellows through said partition for the flow of said liquid therethrough.

4. A device responsive to differential pressures comprising means providing two chambers defined from each other by a partition, means for conducting pressures to said chambers respectively, a bellows in each chamber, said bellows being of equal effective areas and having their adjacent ends secured to opposite sides of the partition, means rigidly connecting the remote ends of the bellows through the partition to cause them to move in unison under the influence of pressure applied to their respective chambers, a liquid filling the bellows, means forming a seal between the connecting means and the partition, means providing a passage connecting the bellows through said partition for the flow of said liquid therethrough, and means for adjusting the flow through said passage in said partition.

5. A device responsive to differential pressures comprising means providing two chambers defined from each other by a partition, means for conducting pressures to said chambers respectively, a bellows in each chamber, said bellows being of equal effective areas and having their adjacent ends secured to opposite sides of the partition, a stem rigidly connecting remote ends of the bellows through the partition to cause them to move in unison under the influences of pressures applied to their respective chambers, a liquid filling the bellows, means forming a seal between the stem and the partition, a bypass in the partition around the seal, means for regulating the flow through the bypass, valve seats on the partition, said bypass terminating at its ends within the valve seats and means providing valve closures on the stem adapted to seat on the valve seats when the differential in the pressures applied to said chambers becomes excessive to close the bypass against flow therethrough.

6. A device responsive to differential pressures comprising means providing two chambers defined from each other by a partition, means for conducting pressures to said chambers respectively, a bellows in each chamber, said bellows being of equal effective areas and having their adjacent ends secured to opposite sides of the partition, a stem rigidly connecting remote ends of the bellows through the partition to cause them to move in unison under the influences of pressures applied to their respective chambers, a liquid filling the bellows, a ring on the stem having a spherical external surface slidably engaging a cylindrical surface on the partition surrounding the stem, shoulders on the stem against which the ring may laterally seat, said ring having an internal clearance with relation to the stem but being laterally engageable against said shoulders to form a seal against flow from one bellows to another around the stem, and a restricted bypass in the partition around the seal formed by said ring.

7. A device responsive to differential pressures comprising means providing two chambers defined from each other by a partition, means for conducting pressures to said chambers respectively, a bellows in each chamber, said bellows being of equal effective areas and having their adjacent ends secured to opposite sides of the partition, a stem rigidly connecting remote ends of the bellows through the partition to cause them to move in unison under the influences of pressures applied to their respective chambers, a liquid filling the bellows, a ring on the stem having a spherical external surface slidably engaging a cylindrical surface on the partition surrounding the stem, shoulders on the stem against which the ring may laterally seat, said ring having an internal clearance with relation to the stem but being laterally engageable against said shoulders to form a seal against flow from one bellows to another around the stem, a bypass in the partition around the seal formed by said ring, and means for adjusting the rate of flow through the bypass operable from the exterior of said chambers.

BARTON JONES.

REFERENCES CITED

The following references are of record in the file of this patent:

UNITED STATES PATENTS

| Number | Name | Date |
|---|---|---|
| 897,730 | Fulton | Sept. 1, 1908 |
| 2,276,505 | Moore | Mar. 17, 1942 |
| 2,400,048 | Jones | May 7, 1946 |